United States Patent
Lewit et al.

[11] Patent Number: 5,429,066
[45] Date of Patent: Jul. 4, 1995

[54] COMPOSITE STRUCTURES AND METHOD OF MAKING COMPOSITE STRUCTURES

[75] Inventors: Scott Lewit, Malabar; Neil Rohan, New Smyrna Beach, both of Fla.

[73] Assignee: Compsys, Inc., W. Melbourne, Fla.

[21] Appl. No.: 181,321

[22] Filed: Jan. 14, 1994

[51] Int. Cl.⁶ .............................................. B63B 5/24
[52] U.S. Cl. .................................. 114/357; 264/46.4; 264/46.6; 264/258
[58] Field of Search .............. 114/357; 264/258, 46.4, 264/46.6

[56] References Cited

U.S. PATENT DOCUMENTS

| | | | |
|---|---|---|---|
| 3,567,565 | 3/1971 | Jones et al. | |
| 3,840,926 | 10/1974 | Stoeberl | 114/357 |
| 3,848,284 | 11/1974 | Livingston | 114/357 |
| 4,065,820 | 1/1978 | Starrah, Jr. | 114/357 |
| 4,099,280 | 7/1978 | Hoppe et al. | 114/357 |
| 4,205,408 | 6/1980 | Glass et al. | 114/357 |
| 4,268,571 | 5/1981 | McCarthy | 264/46.6 X |
| 4,471,020 | 9/1984 | McCarthy | 264/66.6 X |
| 4,510,200 | 4/1985 | Samowich | 428/252 |
| 4,695,501 | 9/1987 | Robinson | 428/159 |
| 4,764,238 | 8/1988 | Dastin et al. | 156/245 |
| 4,800,114 | 1/1989 | Cichanowski | 428/175 |
| 4,801,496 | 1/1989 | Buchacher | 428/285 |
| 4,812,194 | 3/1989 | Pelz | 156/307.3 |
| 4,851,283 | 7/1989 | Holtrop et al. | 428/284 |
| 4,877,476 | 10/1989 | Wolf | 156/307.3 |
| 5,068,001 | 11/1991 | Haussling | 156/307.3 X |
| 5,258,585 | 11/1993 | Juriga | 181/286 |

*Primary Examiner*—Sherman Basinger
*Attorney, Agent, or Firm*—Quarles & Brady

[57] ABSTRACT

A composite structure and method of making the composite structure are disclosed. A reinforcing fabric such as fiberglass is mechanically attached, for example, by stitching to a non-woven polyester fabric. The attached fabrics are placed in a mold with the non-woven fabric facing the inside of the mold. A self-expanding, self-curing foam is filled into the mold in an amount sufficient so that upon expansion in the closed mold, the foam penetrates into the interstices of the non-woven fabric which upon curing forms a bond therewith. The resulting structure can be used in a number of applications wherein the reinforcing fabric is later impregnated, for example, with a resin, and allowed to cure. Typical use of such a structure is as a stringer in fiberglass boat construction.

32 Claims, 4 Drawing Sheets

COMPOSITE STRUCTURES AND METHOD OF MAKING COMPOSITE STRUCTURES

BACKGROUND OF THE INVENTION

This invention relates to a composite structure and method of making composite structures. More particularly, the invention relates to composite structures which are especially adapted for simplifying fabrication of a number of articles such as boats, ships, body parts for automobiles, trucks and the like. The composite structure in accordance with the invention is especially adapted for use in high-stress and hostile environment applications, and do not breakdown in such environments over periods of time.

In the past, a number of structural composite articles have been developed using a variety of different technologies. One prior art technique involves interweaving yarns of polyester fibers with yarns of fiberglass fibers to form a composite fabric. The fabric is then fitted within a mold and soaked with resin. The formed fabric and resin composition is then allowed to harden within the mold. While providing a generally rigid structure, such a technique includes a number of limitations, among them the inability to produce a variety of different shapes of substantial bulk or complex dimensions.

Another prior art technique involves manufacturing a light weight energy-absorbing structure made up of a laminate including a plurality of fabrics. The fabrics are pre-impregnated with a thermosetting resin and abutted against a core of cellular foam which has had a bonding material applied at the interface between the impregnated fabric and the foam. Heat is applied to cure the resin and the bonding material. However, when bonding material is used, it is often the case in hostile environments that the bonding material breaks down, an undesirable result when such structures are used in high load or stress applications.

Yet still another prior art technique involves the manufacture of a thermoformable composite article comprised of a core layer made of a synthetic resin foam. A pair of adhesive layers are placed in contact with the opposite upper and lower surfaces of the core layer and a pair of fabric layers are superimposed on the opposite upper and lower surfaces of the core layer. The fabric layers are bonded to the core layer by the adhesive layers. At least one of the fabric layers is made of a non-woven fabric which has been impregnated with a thermoplastic or thermosetting resin. This technique also involves the disadvantages noted above with respect to the use of adhesives.

In boat building, especially fiberglass boats, hulls are typically reinforced by a grid arrangement of structural members known as "stringers" and "bulkheads," hereafter collectively referred to as "stringers." Present boat-building technology typically employs plywood stringers, although a small percentage uses fiberglass-/foam stringers. The plywood stringer system involves several process stages. The plywood is first cut to shape by a cutter or by hand with the use of templates. The stringer system which is commonly made up of interlocking stringers and bulkheads is assembled outside of the boat, with interlocking pieces being held with staples. Once the system is assembled, it is then placed in a boat as a module and laminated into place using a combination of reinforcing fabrics.

Fiberglass stringers are installed in a slightly different manner from plywood stringers. One way of installing such stringers is to cut blocks of foam into the shape of the stringers. The stringer shaped foam is then bonded into the hull and covered with fiberglass. Another way is that the fiberglass shell of the stringer is first laminated using a male mold. The stringer is then ground to fit into the boat and once the stringer has been ground to fit, it is spaced off of the bottom of the boat to avoid cracking problems. The stringer is then laminated into place and holes are drilled into the stringer and the stringer is filled with a two-part urethane foam.

Future boat construction is expected to use closed molding technologies. The reason for this is 1) to control noxious vapor emissions into the environment, and 2) to reduce labor costs. Such future technology will generally require use of stringer systems made of composite structures compatible with such closed moldings. Conventional stringer systems are not well suited to such technologies since they will need to be installed after the hull has been laminated using an open mold. Wood stringers would be difficult to incorporate into a closed mold due to height and width constraints. Further, prepositioning of fiberglass reinforcement normally hand laminated over the wood or foam stringer system would be costly and create quality control problems. Conventional fiberglass stringers also pose problems due to the void in the stringer structures. Specifically, since foam is injected into such stringer after installation, it becomes difficult to keep the resin from filling the inside of the stringer.

In accordance with the invention, these and other problems with the prior art are avoided by providing a composite structure and method of making such structure which avoids the use of adhesive and lends itself to a variety of shapes, structures and applications. In one specific aspect, the composite articles manufactured in accordance with the method are used as stringers and bulkheads in boat manufacturing technology greatly simplifying the manufacture of boats, and permitting their use in closed mold environments.

SUMMARY OF THE INVENTION

In accordance with one aspect of the invention there is provided a composite structure. The composite structure is made up of a reinforcing fabric layer. A non-woven fabric layer, such as a mat fiber layer, is attached to the reinforcing fabric layer. A structural foam is attached to the non-woven fabric layer on the side of the non-woven fabric layer opposite the reinforcing fabric, by filling the interstices (pores) of the non-woven fabric layer.

In a more specific aspect, the reinforcing fabric is preferably a directional reinforcing fabric composed of organic or inorganic fibers such as glass fiber, carbon fiber, an aramid fiber such as is commercially available from DuPont Corporation under the trade name Kevlar, a linear polyethylene or polypropylene fiber such as is commercially available from Allied-Signal, Inc. under the trade name Spectra, and polyester fibers. The reinforcing layer is made of directional or oriented reinforcing fiber fabric. An example of such fabrics includes a woven fabric similar to clothing fabric, but courser. Another example is a multi-layer stitched fabric. Such a fabric may have one layer oriented in one direction, e.g., 45°, a second layer in another direction, e.g., −45°, and a third layer in a third direction, e.g., 0°, with all layers stitched together.

In a more specific aspect, the reinforcing fabric is mechanically attached to the non-woven fabric, preferably by stitching, needle punching, or powder binder or adhesive. If adhesive or powder binder is used, it is recognized that it may breakdown eventually. However, when the article of the invention is used in a laminated environment, such as a stringer in a boat, the resin used to laminate the stringer into the boat will displace the adhesive or binder and take its place in holding the structures and fabrics together. The structural foam is a two-part, self-expanding, self-curing urethane foam which has been expanded and cured to attach itself to the non-woven fabric by having expanded into the interstices of the non-woven fabric. More specifically, the urethane foam is buoyant, with the non-woven fiber being a material such as is commercially available under the trade name Trevira Spunbond which is commercially available from Hoechst Celanese Corporation and is generally a non-woven fabric composed of continuous thermoplastic fiber, needle punched together to yield a felt-like fabric. In addition to fabrics such as Trevira Spunbond, other materials such as polyester staple mat, glass fiber mat, as well as other organic and inorganic fiber mats and fabrics can be employed. In a more specific aspect, the composite structure of the invention is shaped in the form of a stringer for use in boat construction.

In another aspect, the invention relates to a method of making a composite structure. The structure is made by the steps of attaching a reinforcing fabric layer to a non-woven fabric layer on one side thereof. The attached fabric layers are laid into a mold with the non-woven fabric layer facing the interior of the mold. The mold is then filled, at least partially, with a self-expanding, self-curable and at the time, uncured structural foam. The mold is preferably then closed and the foam is allowed to expand and cure to attach itself to the non-woven fabric layer by filling the interstices of the non-woven fabric layer to thereby result in the composite structure.

In a more specific aspect, the attaching step is conducted by mechanically attaching the reinforcing fabric layer to the non-woven fabric layer, in two cases by stitching or by needle punching. The reinforcing fabric layer is preferably a directional reinforcing fabric layer made up of woven or stitch bonded organic or inorganic structural reinforcing fiber such as fiberglass, carbon fiber, aramid fiber such as is available under the name Kevlar, linear polyethylene or polypropylene fiber such as is available under the name Spectra or polyester fiber. The non-woven fabric layer is of the type available under the name Trevira Spunbond, which is a non-woven polyester fabric, as well as other organic or inorganic fiber mat previously discussed.

With respect to the structural foam as applied in the method, it is preferably a self-expanding, self-curing urethane foam, and the method further includes the step of allowing the foam to partially expand before filling the foam into the mold. The mold is filled with an amount of foam effective to cause the foam to penetrate into the interstices of the non-woven fabric as it expands and to cure without penetrating into the reinforcing fabric layer. In order to avoid the foam penetrating into the reinforcing fabric layer, either the non-woven fabric is made of sufficient thickness to achieve this effect, or additional layers of non-woven fabric are laid on the layer of the non-woven fabric attached to the reinforcing fabric prior to adding the foam. In the latter case, the separate layer of non-woven fabric is of sufficient thickness to allow the foam to penetrate therethrough and into the layer of non-woven fabric attached to the reinforcing fabric layer, without penetrating into the reinforcing fabric layer.

In yet another aspect of the invention, there is provided a method of manufacturing a boat. The method involves the steps of spraying a layer of gelcoat into a boat-hull mold and allowing the gelcoat layer to cure. As is well known to those of ordinary skill in the art, gelcoat is a filled polyester resin surface coat (paint) that protects the fiberglass of the hull from weathering. It also provides the cosmetic finish for the fiberglass boat hull. The gelcoat also includes pigments, ultraviolet (UV) stabilizers and fillers. It is not a fiberglass reinforced layer. A skin coat of fiberglass mat is laid on the gelcoat. Following cure of the skin coat, the structural layers are installed on the boat. Stringers are then laid throughout the mold in a reinforcing arrangement on top of the structural layers of fiberglass. The stringers are made as a composite structure as described previously in accordance with the invention.

The stringers also have flaps of the attached reinforcing fabric layer and non-woven fabric layer extending from the structure which are not attached to the foam. The stringers are laid so that the flaps lay on the structural layers of fiberglass. The structural layer of fiberglass and the stringers are impregnated with a curable resin and thereafter cured to result in a boat hull having the stringers attached thereto.

In this regard, it is noted that the stringers in accordance with the invention may be installed in three different manners. One method involves placing the stringers in a closed mold with other reinforcing fabric. Resin is then introduced to create the "fiber reinforced plastic" (FRP) structure. Another method requires placing the stringers on "wet," i.e., uncured resin, laminate in an open mold. The stringers are then wet out with resin and the hull and stringer laminates are allowed to cure together. Yet another method involves placing the stringers on a cured hull laminate in an open mold. The stringers are then wet out with resin which then cures to form the stringer laminate. Of the three methods, the first two produce stronger joints between the hull and stringer laminates since the resin in each cures together maximizing primary bonding. It also reduces molding time, thus allowing the mold to be cycled faster.

In one specific aspect, the coat of fiberglass is impregnated with resin and cured prior to laying the stringers therein. Thereafter, layers of chopped fiberglass are laid on the cured skin coat at the locations where the stringers are to be laid and the chopped fiberglass and stringers are then impregnated with resin. The impregnated stringers are laid on the layers of chopped fiberglass and the entire arrangement is cured.

BRIEF DESCRIPTION OF THE DRAWINGS

Having thus briefly described the invention, the same will become better understood from the following detailed discussion, read in conjunction with the drawings wherein.

DETAILED DISCUSSION OF THE INVENTION

Figure 1:
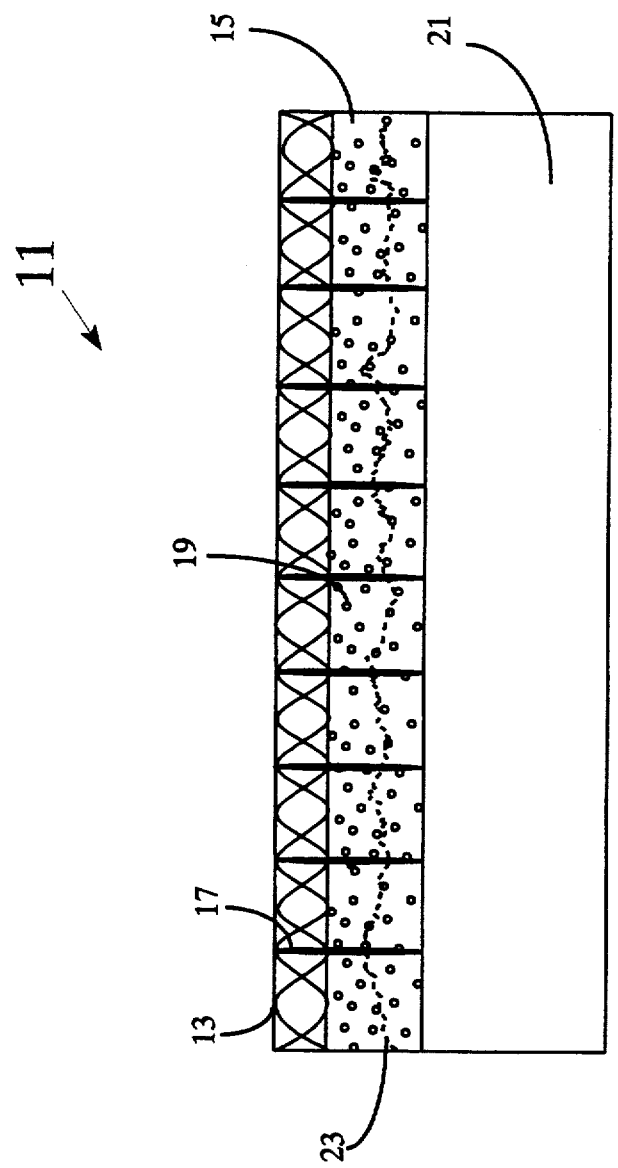
FIG. 1 is a partial, side cross-sectional view of a composite structure in accordance with the invention.

FIG. 1 illustrates a typical construction for a composite structure 11 in accordance with the invention. The structure 11 is made up of a reinforcing fiber layer 13, preferably a directional reinforcing fiber layer of organic or inorganic structural reinforcing fibers such as fiberglass, carbon fibers, aramid fibers such as is available under the name Kevlar, linear polyethylene or polypropylene fibers such as is available under the name Spectra, or polyester fibers. By reinforcing fiber is meant a fiber which when added to a composite material enhances the structural properties of the material. The fibers can be randomly oriented, or preferentially, they can be oriented in one or more directions. While a number of specific types of materials have been given for use as the reinforcing fiber layer, it will be appreciated by those of ordinary skill in the art that other equivalent-type reinforcing fiber layers can be employed in the practice of the invention.

The fiber layer 13 is attached to a non-woven fiber layer 15 which has a large number of interstices or pores 19. Preferably, the reinforcing fiber layer 13 and non-woven fiber layer 15 are secured to each other mechanically. Such mechanical attachment is typically done by conventional stitching 17. Other means of attachment, as noted previously, include alternatives such as needle punching, stapling or buttons. In the case of certain non-hostile environment applications even adhesives can be used as discussed previously.

A structural foam 21 is attached to the nonwoven layer 15 by having penetrated into the interstices 19 at penetration region 23 of the foam 21 during the manufacture of the structure 11. Preferably the foam is a self-expanding, self-curing urethane foam which has been caused to expand at region 23 into the interstices 19 of non-woven layer 15 by having been filled into a mold in an amount sufficient to cause pressure as a result of expansion of the foam 21 to penetrate at region 23 into the interstices 19 of the non-woven layer 15.

The interaction between the foam 21 and non-woven layer 15 provides a number of mechanical advantages over other structures. More specifically, the low density urethane foams used in the practice of the invention typically have tensile strengths of about 50 pounds per square inch (psi) with an elongation of under 7%. When such a foam is expanded into a non-woven fabric, the mechanical properties of the fabric/foam system increases significantly. In the case where the fabric used is a continuous filament needle punched thermoplastic polyester fabric such as Trevira Spunbond, the mechanical properties of the Trevira/foam system increases to around 2,000 to 3,000 psi, with an elongation of over 20%. All of these non-woven fibers are typically non-woven organic or inorganic fiber mat, for example, polyester, fabrics of conventional construction.

Figure 2:
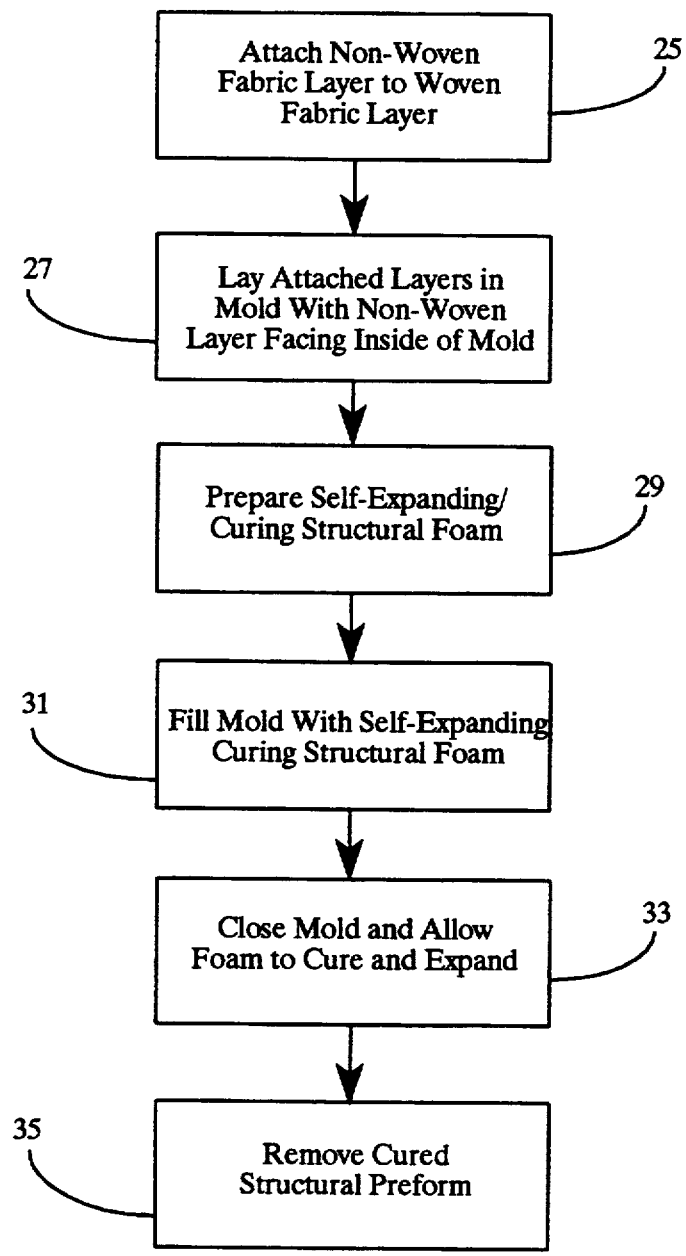
FIG. 2 is a block diagram showing the sequence of steps of making the composite structure in accordance with the method of the invention.

The method of making the composite structure in accordance with the invention is illustrated in FIG. 2.

In a first step 25 the non-woven fabric layer 15 is attached to the reinforcing fabric layer 13. Preferably such attachment is done by stitching. Alternatively, as noted previously, the fabrics can be secured to each other by means of needle punching, staples or buttons or other mechanical technologies sufficient to secure one fabric to the other. After attaching the two layers of fabrics together, the attached layers are laid in a mold at a step 27 with the non-woven layer 15 facing the inside of the mold.

At step 29 a self-expanding, self-curing structural foam is prepared/mixed. Typically, such a self-rising, self-curing foam is a urethane foam commercially available from BASF, MOBAY, PPG and is typically an MDI-based rigid polyurethane foam (methylene-diphenyl-methane diisocyanate) using "hydrogenated chlorofluorocarbons" (HCFC), water and/or $CO_2$ as a blowing agent. The mold is then filled with the self-expanding and self-curing structural foam at step 31 in an amount sufficient to allow for expansion of the foam after the mold is closed. This generates enough pressure so that the foam penetrates into the interstices 19 of the nonwoven fabric layer 15. On average, enough foam is added to generate pressures of about 5–18 "pounds per square inch" (psi), at a minimum 5 psi, and at an optimum pressure of 10 psi. The mold is closed at step 33 and the foam is allowed to cure and expand therein. At step 35 the formed article is then removed after curing.

The articles manufactured in accordance with the method of the invention can be molded in a variety of different shapes and applied in a number of different technologies. One specific application for the articles is in the boat building industry wherein the articles can be shaped as stringers to replace conventional wood stringers or fiberglass stringers used in the manufacture of fiberglass boats. The use of stringers in accordance with the practice of the invention results in a modular approach to boat manufacturing that saves the boat builder time and money, particularly for small boats. More specifically, conventional stringer systems take approximately six man hours to install. Stringers manufactured in accordance with the method of the invention require approximately twenty to forty man minutes to install on a cured hull. If the stringer system of the invention is installed and wet out with resin while the hull laminate resin is still "wet," i.e., uncured, molding time can also be significantly reduced. Thus, the process reduction results in substantial cost savings and decreased mold cycle times.

The stringers in accordance with the structure of the invention are especially adapted for use in boat construction. Typically, open-molded boat construction begins with a gelcoat being first sprayed into a mold. Once the gelcoat has cured, a skin coat consisting of chopped strand mat or chopped roving, woven roving or stitch bonded fiberglass is laid on the cured gelcoat layer. This will result in the structural layer of the boat. Typically, such a layer is then impregnated with a resin and allowed to cure to form the structural layer, and the stringers are laid therein after curing.

Figure 3:
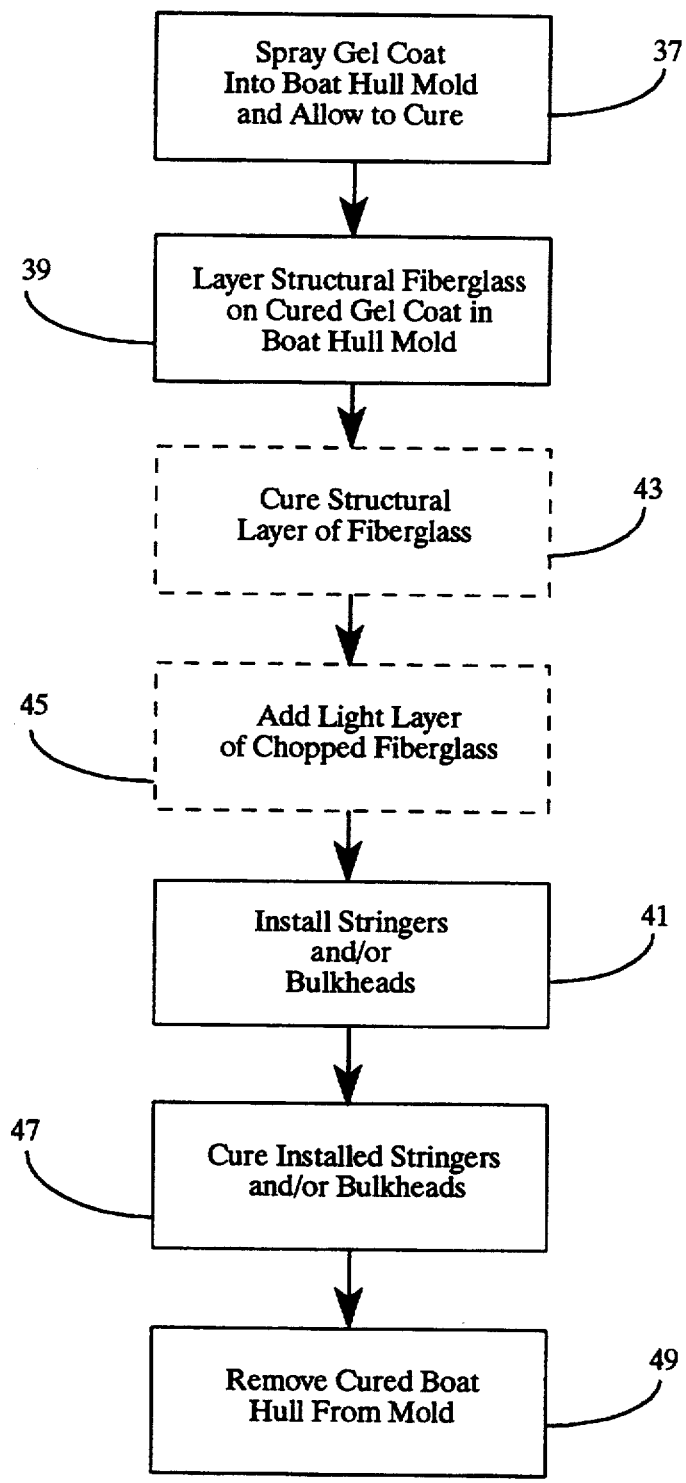
FIG. 3 is a block diagram showing a sequence of steps illustrating the method of manufacturing boats using the composite structure in accordance with the invention as stringers for the hull of the boat.

In accordance with the method of the invention as illustrated in FIG. 3, the gelcoat is first sprayed at step 37 into a boat-hull mold and allowed to cure. The structural fiberglass is layered at step 39 in the same manner as in conventional boat construction. In a preferred aspect, the stringers are then installed at step 41, preferably with the layer of structural fiberglass having been impregnated and the stringers having been impregnated with a setting resin. At step 47 the installed stringers are then cured along with the structural layer, and at step 49 the boat hull is then removed from the mold.

In an alternative implementation, the structural fiberglass is initially cured at a step 43 and thereafter at step 45 a light layer of chopped fiberglass is added at the locations where the stringers are to be installed. In this alternative, the light layer of chopped fiberglass is impregnated with resin and the stringers are impregnated with resin and then installed. The entire system is then allowed to cure. The process follows thereafter the same as with the initially described process with reference to FIG. 3.

Figure 4:
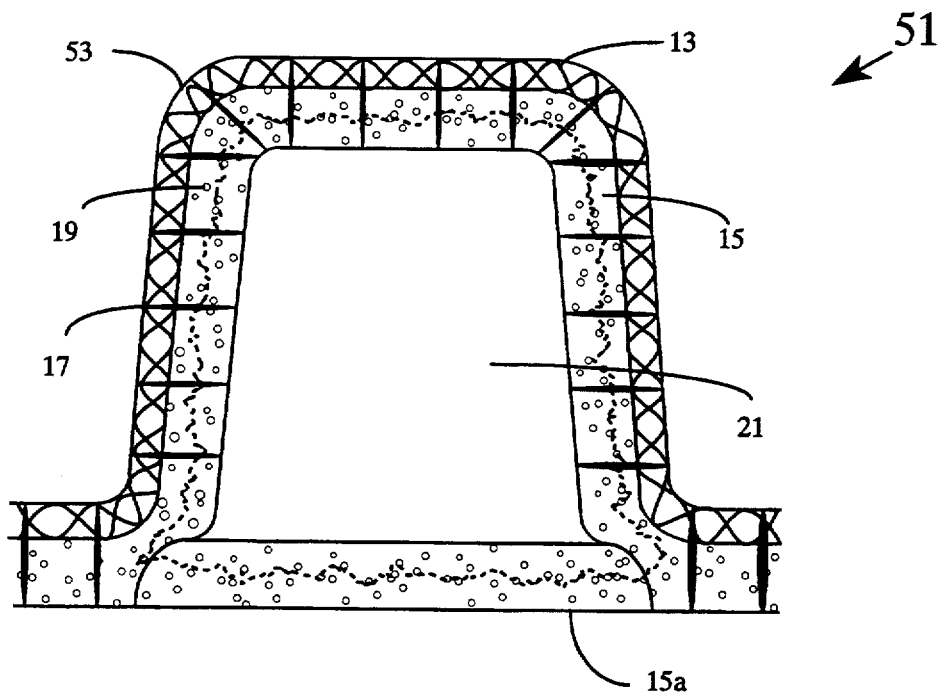
FIG. 4 is an end, cross-sectional view of a typical stringer construction made according to the method of the invention.

A number of advantages result in construction in accordance with the above-described system. First, as illustrated in FIG. 4, it will be appreciated that a stringer 51 in accordance with the structure of the invention can be made with rounded corners 53 which results in reduced stress on the cured fiberglass woven fiber 13 as implemented in use in boat construction because resin impregnated cured fiberglass generally weakens at sharp corners. The appropriate shape of a mold in making the structure 11 of the invention can avoid such sharp corners. Optionally, to provide increased tensile strength to the urethane foam 21, an additional layer 15a of non-woven fiber can be attached to the lid of the mold to ensure that the fiber becomes secured to the foam at a region wherein the reinforcing fiber 15, i.e., fiberglass, is not required. As noted previously, the use of the non-woven fiber interfaced with the foam 21 provides increased structural properties.

Figure 5:
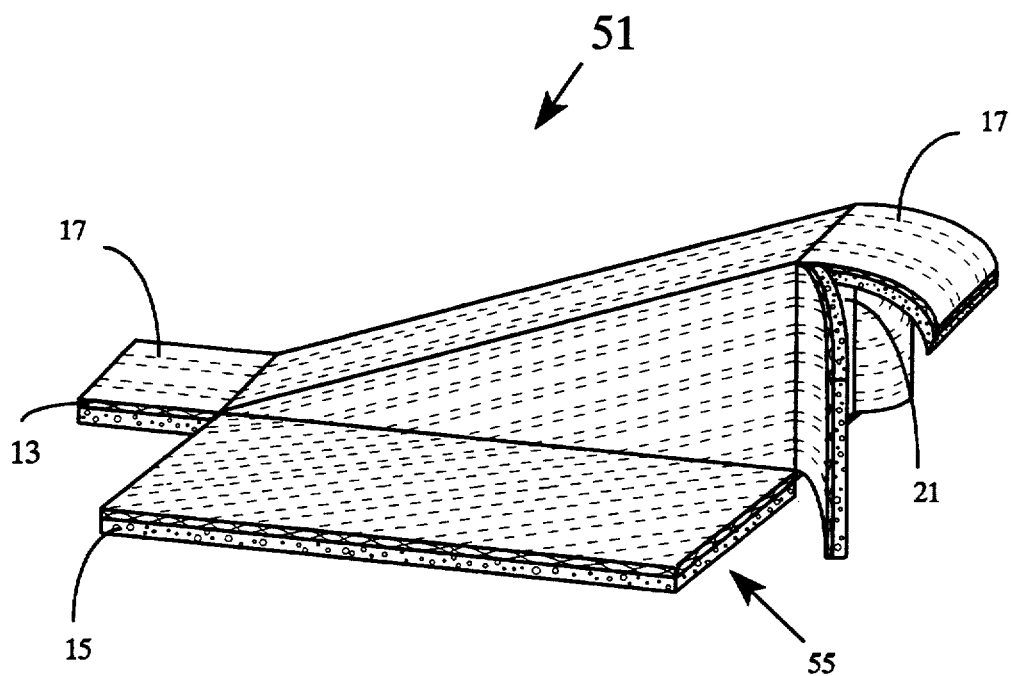
FIG. 5 is a perspective view of a stringer having been manufactured in accordance with the method of the invention.

A typical stringer 51 in accordance with the invention is better illustrated in FIG. 5. The stringer 51 includes a number of flaps 55 made up of secured non-woven fiber layer 15 and reinforcing structural fiber layer 13. Thus, in constructing the boat using the stringers of the invention, the stringers 51 with the reinforcing layer 13 facing upward, can be laid on the hull structure and the flaps 55 laid out over the structural fiberglass of the hull. The stringer 51 and the structural fiberglass of the hull are impregnated with resin, with the resin on the stringer 51 passing through reinforcing layer 13 and non-woven layer 15 to contact resin impregnating the hull fiberglass, and then cured. The flaps 53 then form a bond between the stringer 51 (at the bottom of the structure, and at the flaps) and the structural hull of the boat. As can be appreciated, a number of advantages result. One advantage is that a primary bond due to chemical interaction is formed between the flaps 55 and the fiberglass of the boat. This provides significantly enhanced strength to the boat hull as compared to conventional secondary bonding done through the conventional laminating when conventional wood or fiberglass stringer technology is used.

While the invention has been described with reference to its use as stringers or bulkheads for boats, it will be appreciated by those of ordinary skill in the art that other uses can be made of the composite structures in accordance with the invention. For example, such structures can be used as reinforcing rods for automobile body parts such as trunk lids. Likewise, another use can be in architectural applications where the structures could be integrated into panel fabrication processes as structural ribs or stiffeners. A particular advantage is found in the use of the structures as stringers in that there is provided increased bonding area due to the flaps and underside of the stringers, as well as a high degree of flotation due to the urethane foam. This eliminates or minimizes the need for later injection of foam for flotation purposes as mandated by existing boat manufacturing standards.

Although particular preferred embodiments of the invention have been disclosed in detail for illustrative purposes, it will be recognized that variations or modifications of the disclosed invention, including the use of additional layers of fabric, adhesive or synthetic resin, lie within the scope of the present invention.

What is claimed is:

1. A composite structure having an exposed reinforcing fabric layer free of structural foam and curable resin, said structure comprising:
    a reinforcing fabric layer;
    a non-woven fabric layer attached to said reinforcing fabric layer; and
    a structural foam attached to said non-woven fabric layer on the side of said non-woven fabric layer opposite said reinforcing fabric layer by having filled interstices of said non-woven fabric layer without penetrating into the reinforcing fabric layer;
    wherein said reinforcing fabric layer of said composite structure is capable of being saturated with curable resin after said structural foam has been attached to said non-woven fabric layer.

2. A composite structure as in claim 1 wherein said reinforcing fabric layer is a directional reinforcing fabric.

3. A composite structure as in claim 1 wherein said reinforcing fabric layer is composed of organic or inorganic fibers.

4. A composite structure as in claim 1 wherein said reinforcing fabric layer is one of fiberglass, carbon fiber, aramid fiber, linear polyethylene or polypropylene fiber, and polyester fiber.

5. A composite structure as in claim 1 wherein said non-woven fabric layer is one of nonwoven fabric composed of continuous thermoplastic fibers, needle punched together as a felt-like fiber.

6. A composite structure as in claim 5 wherein said reinforcing fabric is mechanically attached to said non-woven fabric by stitching.

7. A composite structure as in claim 1 wherein said non-woven fabric layer is one of polyester staple mat, glass fiber mat, organic fiber mat and inorganic fiber mat.

8. A composite structure as in claim 1 wherein said reinforcing fabric is mechanically attached to said non-woven fabric.

9. A composite structure as in claim 7 wherein said structural foam is a two-part, self-expanding, self-curing urethane foam which has been expanded and cured to attach itself to said non-woven fabric by having expanded into the interstices of said non-woven fabric.

10. A composite structure as in claim 9 wherein said urethane foam is buoyant.

11. A composite structure as in claim 1 shaped in the form of a stringer for boat construction.

12. A method of making a composite structure having an exposed reinforcing fabric layer free of structural foam and curable resin, said method comprising the steps of:
    attaching a reinforcing fabric layer to a non-woven fabric layer on one side thereof;
    laying said attached fabric layers into a mold with the non-woven fabric layer facing the interior of the mold;

filling said mold with a self-expanding, self-curable, uncured structural foam; and allowing said foam to expand and cure to attach itself to said non-woven fabric layer by filling interstices of said non-woven fabric layer in a manner such that said foam does not penetrate into the reinforcing fabric layer to thereby result in said composite structure, and wherein said reinforcing fabric layer of said composite structure is capable of being subsequently saturated with curable resin after said structural foam has been attached to said non-woven fabric layer.

13. A method as in claim 12 wherein said attaching step is conducted by mechanically attaching said reinforcing fabric layer to said non-woven fabric layer.

14. A method as in claim 13 wherein said mechanical attaching is conducted by stitching.

15. A method as in claim 12 wherein said reinforcing fabric layer is a directional reinforcing fabric layer.

16. A method as in claim 12 wherein said reinforcing fabric layer is made of one of fiberglass, carbon fiber, aramid fiber, linear polyethylene or polypropylene fiber, and polyethylene fiber.

17. A method as in claim 12 wherein said reinforcing fabric layer is composed of organic or inorganic fibers.

18. A method as in claim 12 wherein said non-woven fabric layer is a non-woven fabric composed of continuous thermoplastic fiber needle, punched together as a felt-like fiber.

19. A method as in claim 18 further comprising the step of laying a separate layer of non-woven fabric on the layer of non-woven fabric attached to said reinforcing fabric layer prior to adding said foam to said mold, with said separate layer of non-woven fabric being of sufficient thickness to allow said foam to penetrate therethrough and into the layer of non-woven fabric attached to said reinforcing fabric layer, without penetrating into said reinforcing fabric layer.

20. A method as in claim 12 wherein said non-woven fabric layer is one of polyester staple mat, glass fiber mat, organic fiber mat and inorganic fiber mat.

21. A method as in claim 12 wherein said structural foam is a two-part, self-expanding, self-curing urethane foam, and further comprising allowing said foam to partially expand before filling said foam into said mold, and filling said mold with an amount of foam sufficient to cause said foam to penetrate into interstices of said non-woven fabric as it expands and cures without penetrating into said reinforcing fabric layer.

22. A method as in claim 12 wherein said structural foam is a two-part, self-expanding, self-curing urethane foam and further comprising filling said mold with an amount of foam sufficient to cause said foam to penetrate into interstices of said non-woven fabric as it expands and cures.

23. A method as in claim 22 wherein said non-woven fabric layer is of sufficient thickness to allow said foam to penetrate into interstices thereof without penetrating into said reinforcing fabric layer.

24. A method as in claim 12 wherein said mold is shaped as a stringer for use in boat construction.

25. A method as in claim 24 wherein said mold has rounded edges and corners.

26. A method as in claim 25 wherein said reinforcing fabric layer is woven fiberglass.

27. A method of manufacturing a boat, comprising the steps of:

spraying a layer of gelcoat into a boat-hull mold and allowing said gelcoat layer to cure;

laying a structural skin coat of fiberglass;

laying stringers throughout said mold in a reinforcing arrangement on said structural skin coat of fiberglass, said stringers being made as a composite structure comprising, a reinforcing fabric layer, a non-woven fabric layer attached to said reinforcing fabric layer, a structural foam attached to said non-woven fabric layer on the side of said non-woven fabric layer opposite said reinforcing fabric layer by having filled interstices of said non-woven fabric layer, and said stringers having flaps of said attached reinforcing fabric layer and non-woven fabric layer extending therefrom and not attached to said foam, with said stringers being laid so that said flaps lay on said structural skin coat of fiberglass;

impregnating said structural skin coat of fiberglass and said stringers with curable resin; and curing said resin to result in a boat hull having said stringers attached thereto.

28. A method as in claim 27 wherein said structural skin coat of fiberglass is impregnated with resin and cured prior to laying said stringers therein, and further comprising the steps of;

laying layers of chopped fiberglass on said cured skin coat at the locations where said stringers are to be laid;

impregnating said chopped fiberglass and stringers with resin;

laying the stringers on said layers of chopped fiberglass; and curing said resin.

29. A method as in claim 27 wherein said reinforcing fabric layer of said stringers is fiberglass.

30. A method as in claim 27 wherein said structural skin layer of fiberglass laid in said mold is one of chopped strand mat, chopped roving, woven roving and stitch bonded fiberglass.

31. A method as in clam 27 wherein said impregnation with resin is conducted prior to laying said stringers in said mold.

32. A method as in claim 27 wherein the reinforcing fabric layer and non-woven fabric layer of said stringers are mechanically attached.

* * * * *